United States Patent [19]

Green, III et al.

[11] 4,078,911

[45] Mar. 14, 1978

[54] MEASUREMENT OF ELEVATIONS IN A FLOAT GLASS FACILITY

[75] Inventors: Charles F. Green, III, Toledo; Russell C. Retzloff, Maumee, both of Ohio

[73] Assignee: Libbey-Owens-Ford Company, Toledo, Ohio

[21] Appl. No.: 766,252

[22] Filed: Feb. 7, 1977

[51] Int. Cl.² .............................................. C03B 18/02
[52] U.S. Cl. ...................................... 65/29; 65/99 A; 65/182 R; 65/158; 356/72; 256/172
[58] Field of Search ................. 65/65 A, 99 A, 25 A, 65/182 R, 29, 158; 356/72, 172

[56] References Cited

U.S. PATENT DOCUMENTS

| 2,053,938 | 9/1936 | Barker, Jr. ......................... 65/158 X |
| 2,482,954 | 12/1969 | Yuen ................................. 65/99 A X |
| 3,551,057 | 12/1970 | Hamilton et al. ..................... 356/172 |
| 3,923,402 | 12/1975 | Turcotte ........................... 356/172 X |

Primary Examiner—Arthur D. Kellogg
Attorney, Agent, or Firm—Collins, Oberlin & Darr

[57] ABSTRACT

This invention pertains to determination of relative elevations of various components of a float glass producing facility. The extremely flat top surface of the bath of molten tin upon which the glass ribbon is formed is utilized as a reference plane. The elevation of this surface is precisely determined, with the elevation serving as a common bench mark for measuring the relative elevations of various components along both sides of the float glass facility.

15 Claims, 4 Drawing Figures

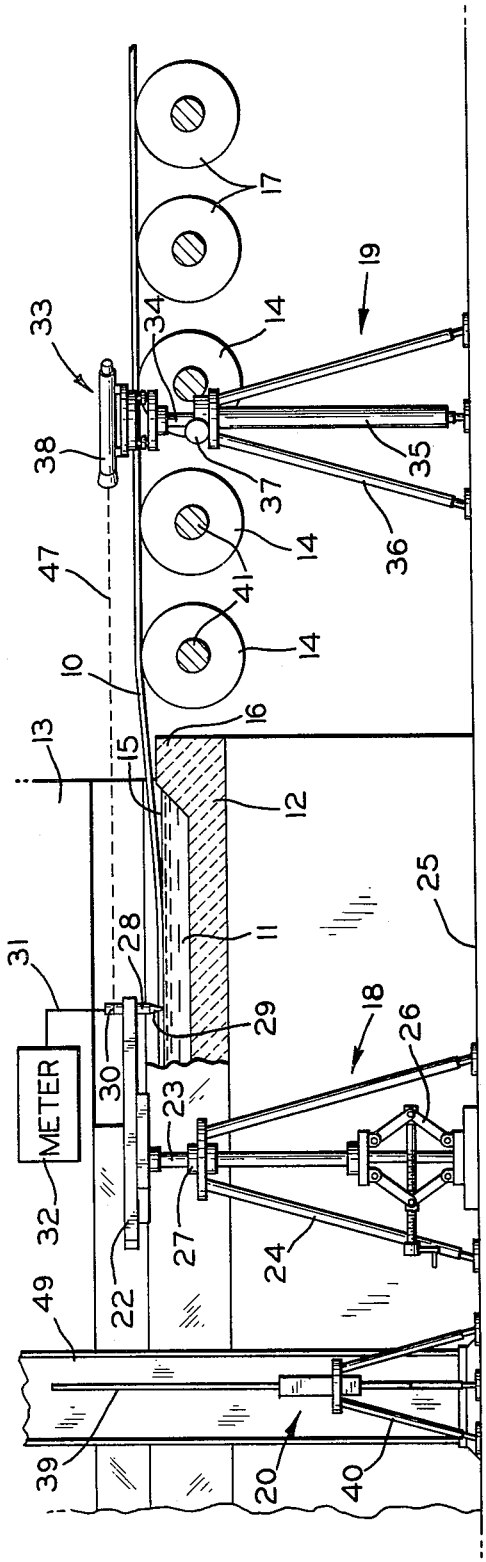
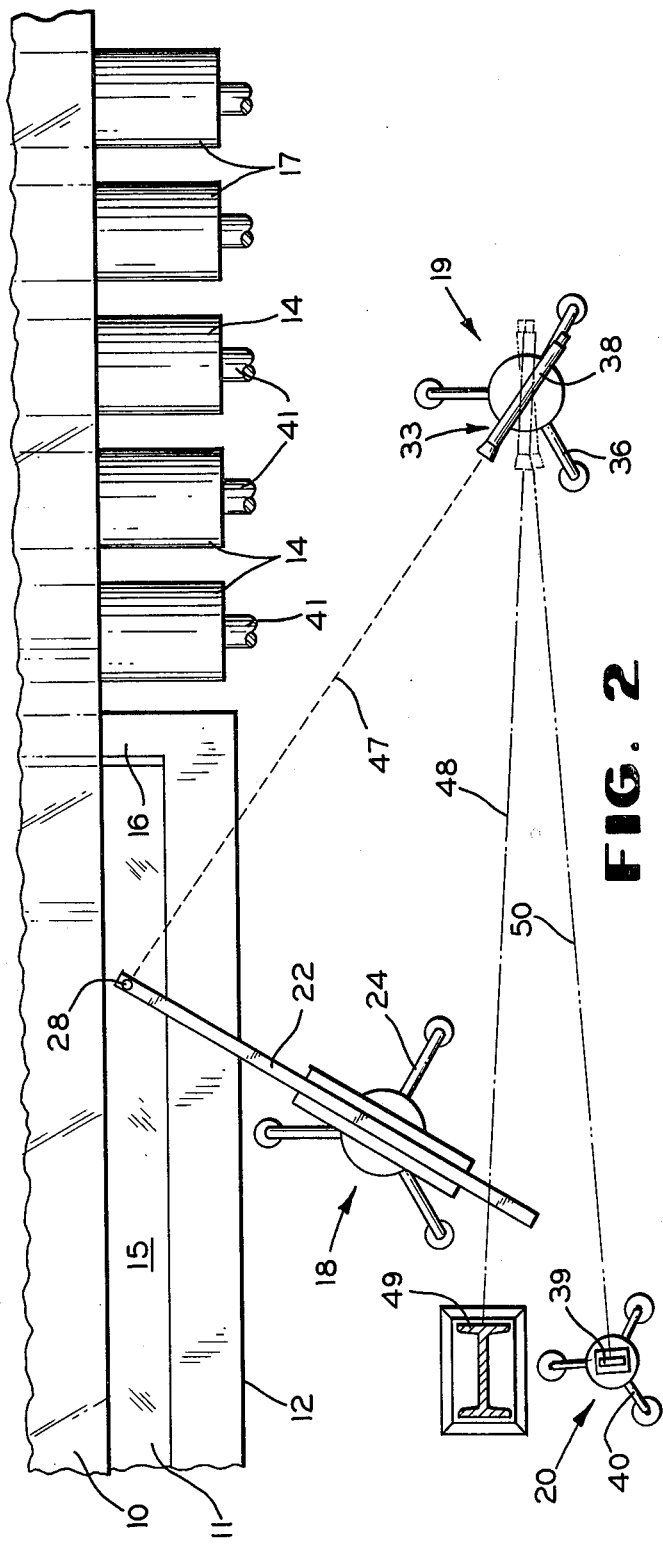

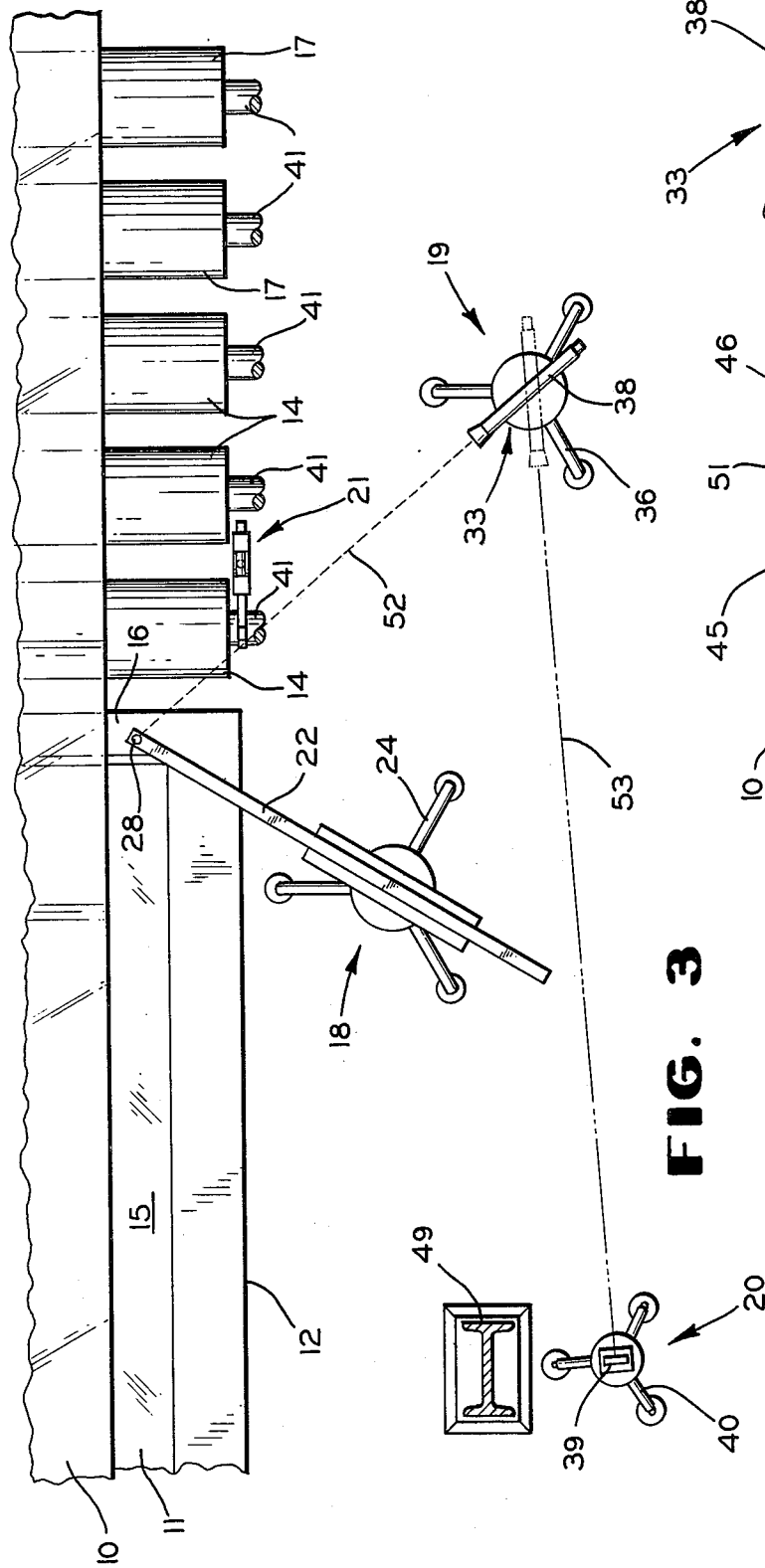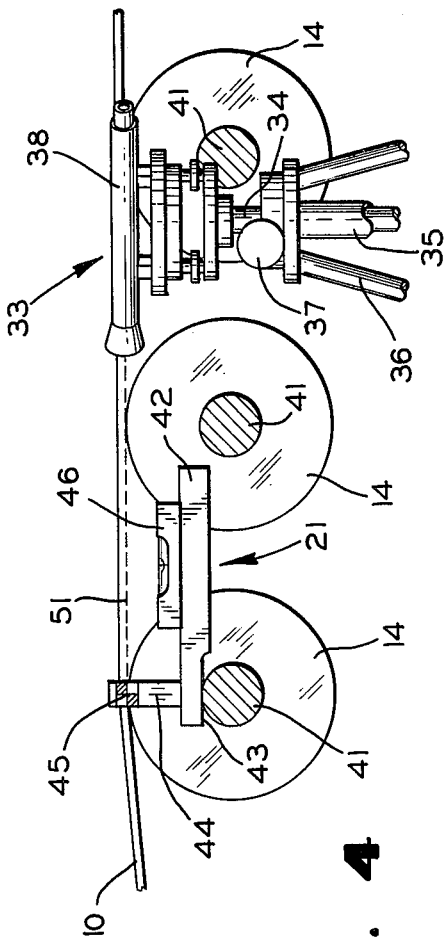
FIG. 3
FIG. 4

MEASUREMENT OF ELEVATIONS IN A FLOAT GLASS FACILITY

BACKGROUND OF THE INVENTION

1. Field of the Invention

The present invention relates broadly to the production of float glass, and more particularly to determination of the relative elevations of various components which are critical in the economical production of a continuous float glass ribbon of high quality.

2. Description of the Prior Art

Manufacture of flat glass by the float process conventionally involves delivering molten glass at a controlled rate onto a bath of molten metal which has a greater density than that of glass (such as tin or alloys of tin, for example) and advancing it along the surface of the metal bath under physical and thermal conditions which assure that a layer of molten glass will be established on the bath, that from this layer there will develop a buoyant body of molten glass of stable thickness, and that the buoyant body in ribbon form will be continuously advanced along the bath and sufficiently cooled as it is advanced to permit its removal from the bath by mechanical conveying means.

Above the bath of molten metal, an enclosed head space or plenum chamber is provided to contain the so-called float atmosphere. This atmosphere is generally a non-oxidizing gas (usually a mixture of gases such as nitrogen and hydrogen) maintained under sufficient pressure to prevent contamination by leakage of external atmosphere into the head space.

The ribbon is generally removed over the exit end wall or lip of the tank containing the metal bath on one or more so-called lift out rolls and, as it is removed, it immediately enters an enclosed lehr through which it is carried upon a series of horizontally aligned rolls while its temperature is gradually reduced according to a predetermined pattern. The resulting annealed ribbon is then cut into blanks of the desired size.

Handling of the ribbon as it leaves the metal bath and passes through the adjacent annealing lehr is critical to the optical quality of the finished ribbon. Thus, it is desirable for the partially stiffened ribbon to be raised slightly and pass very closely over the exit end or lip of the bath structure and follow a prescribed trajectory as it is separated from the molten metal and carried by the lift out and the lehr rolls. The float glass facility generally operates continuously for a period of several years once production is begun. In order to establish and maintain this path it is necessary to periodically accurately determine, and make corrections to, the elevation of the exit lip and rolls relative to the molten metal surface.

Heretofore, such elevations have been determined by conventional surveying techniques using a surveyor's level and level rod, with the line of support for the glass ribbon through the lehr being utilized as a reference elevation. Despite the best efforts at alignment during installation of the lehr rolls, the elevations are not exactly the same from one roll to the next and from one end of each roll to the other. The roll elevations were determined from the roll ends or journals outside the lehr. Since there is no way to sight directly from one side of the enclosed structure to the other at floor level, the line must be carried by conventional surveying techniques over the top of the structure or around its ends, a distance of several hundred feet, in order to correlate the elevations on opposite sides. This is time consuming and introduces the possibility of error. With the prior art technique the elevation of the tin surface is determined by merely immersing a probe into the tin to measure its depth from the bath floor, and then adding this measurement to the elevation of the floor. Such a procedure, while satisfactory in the past, does not give the degree of precision which is desirable in developing modern day refinements of the float process.

SUMMARY OF THE INVENTION

The aforementioned problems inherent in the prior art technique for determining elevations are overcome in accordance with the present invention by utilizing the surface of the molten metal bath as a reference plane. The elevation of the surface is observed directly with a high degree of precision, and the elevations of the other elements of the structure are then observed and related to this reference plane. Since the surface is perfectly flat and horizontal, its elevation can be relied upon as a common reference for measurements on both sides of the bath chamber.

It is, therefore, a primary object of the invention to provide a more accurate system for determining relative elevations of different components of a float glass producing facility.

Another object of the invention is to eliminate reliance upon sea level elevations in such surveys.

Another object of the invention is to utilize the surface of the molten metal as a common bench mark or reference plane for measurements on both sides of the float glass facility.

Still another object is to measure elevations along the path of glass travel with the horizontal surface upon which the ribbon is formed as the datum plane.

Other objects and advantages of the present invention will become clearly apparent from the ensuing detailed description of an illustrated embodiment thereof, taken together with the accompanying drawings wherein like reference characters denote like parts throughout the various views.

BRIEF DESCRIPTION OF THE DRAWINGS

In the accompanying drawings, wherein like numerals are employed to designate like parts throughout:

FIG. 1 is a longitudinal elevational view, partially in section, of a portion of a typical float glass installation illustrating equipment set up in accordance with the present invention;

FIG. 2 is a plan view of the apparatus of FIG. 1, with the plenum chamber removed;

FIG. 3 is a plan view similar to FIG. 2, showing the apparatus arranged for measuring the elevation of the float bath exit lip and lift out rolls; and FIG. 4 is an enlarged elevational view of the apparatus shown in FIG. 3 for determining the elevation of the lift out and lehr rolls.

DESCRIPTION OF THE PREFERRED EMBODIMENTS

Referring now to the drawings, there is illustrated generally in FIGS. 1 to 3 the exit area of a typical float glass apparatus as generally disclosed in United States Patent No. 3,083,551. As therein explained, a glass ribbon 10 is continuously formed on a bath of molten metal 11 contained within a tank 12. An enclosure 13 is provided over the tank, and a protective atmosphere is maintained within the enclosure to prevent contamination of the molten metal and damage to the ribbon until it has been properly formed and conditioned. When the temperature of the ribbon has been lowered sufficiently, it is removed from molten metal bath 11 by so-called lift out rolls 14 adjacent the end of the tank 12. Two or three such lift out rolls are generally employed, and they are positioned with their ribbon supporting portion slightly above the surface 15 of the molten metal so as to lift the ribbon from the metal bath and just over an exit lip 16 at the end of the tank 12. The ribbon is then carried through an adjoining enclosed annealing lehr (not shown) on a series of aligned lehr rolls 17.

The ribbon is in a partially set or stiffened state in the region where it leaves the molten metal bath and enters the annealing lehr, and thus is highly susceptible to damage. The trajectory or path followed by the ribbon in this area has an important bearing upon its ultimate optical quality, and for this reason, as pointed out above, precise determination of the elevation of the rolls 14 and 17 and exit lip 16 relative to the elevation of the surface 15 is desirable.

In accordance with the invention, the elevations are determined by means of a vertically adjustable gauge device, shown generally at 18, a surveyor's level 19, a reference scale 20 and a measuring jig 21 (FIGS. 3 and 4). More particularly, the gauge device 18 comprises a horizontal beam 22 affixed to the movable shaft 23 of a vertically adjustable tripod 24 resting upon the floor 25 beside the float glass facility. The beam may be water cooled in the well known manner if desired. The shaft 23 is supported upon a screw jack 26 by means of which it may be raised and lowered through a slide collar 27 at the top of the tripod. The beam 22 may also be rotated in a horizontal plane about the vertical shaft 23. At one of its ends the beam 22 carries a probe 28 whose lower tip 29 is adapted to make point contact with the surface whose elevation is to be observed. A readily visible mark 30 is provided upon the probe a known distance, for example six inches (15 cm), above the tip 29.

In determining the position of the metal surface 15, the probe is lowered from above by means of the screw jack 26 until is just touches the surface. Since the mark 30 is a known distance from the tip 29 of the probe, it gives a visible and observable indication of the elevation of the surface 15.

It is contemplated that any suitable procedure, including visual observation, may be employed to determine the point at which the tip 29 contacts the surface 15 of the metal bath. A preferred and very precise manner of determining when contact with the metallic body occurs is to connect the probe 28 to a suitable electrical indicating meter. For example, the electrically conducting probe 28 may be connected by a lead 31 to a volt-ohmmeter 32. Thus, with a voltage impressed upon the probe, the meter will clearly indicate when the tip 29 makes contact with the surface 15 of the metal bath 11.

The level 19 may be of a conventional vertically adjustable surveyor's type whose head 33 is mounted upon a spindle 34 received within a sleeve 35 carried by a tripod 36. The head can be swung in a plane normal to the axis of the spindle, and by manipulation of a wheel 37 the spindle can be advanced through the sleeve to raise and lower the head 33 and telescope 38 thereon.

The reference scale 20 is employed to provide a numerical indication of the differences in elevation between the various points, and is located at random so as to be clearly visible when observed through the telescope 38. It comprises a suitably graduated member 39, such as a level rod or a machinists scale, supported in a vertical position by a tripod 40.

The lift out rolls 14 and lehr rolls 17 operate continuously and their glass supporting portion is generally enclosed, so that direct measurement of this portion is impractical. The rolls are precisely machined within close tolerances so that their dimensions are accurately known. Thus, the elevation of the top of the roll can be determined by observing the elevation of the top of the smaller diameter supporting trunnion 41 which extends outside the enclosed area. To this end, the measuring jig 21 is adapted to be hand held and includes a handle 42 having a recessed end portion 43 for resting upon the top of the trunnion 41. An arm 44 affixed to and extending vertically upwardly from the handle has a target 45 thereon which is so positioned upon the basis of the known dimension of the rolls that its horizontal mark is coincident with the top of the sheet supporting main body of the rolls. A bubble tube 46 is provided upon the handle 42 to insure that the handle is held in a horizontal position so that the arm 44 will consequently be vertically oriented to correctly indicate the position of the roll surface.

By way of example, in conducting an elevation survey in accordance with the invention, and with the equipment set up as in FIGS. 1 and 2 alongside the tank 12, one or more side seal panels are removed in the well known manner from the area between the tank side wall and the enclosure 13. The beam 22 is then inserted through this opening and swung around until the probe 28 is located over the exposed metal surface 15 between the edge of the ribbon and the tank side wall. The probe is lowered slowly by means of the screw jack 26 until the meter 32 indicates the tip 29 has just made contact with the surface 15 of the bath of molten metal. With the level 19 set up and properly levelled, the mark 30 on the probe is observed through the telescope 38 and the wheel 37 is manipulated to bring the optical axis of the telescope into alignment with the mark along the line 47 (FIGS. 1 and 2). The telescope is then swung around to the position illustrated in broken lines in FIG. 2, and a sighting is made along a line 48 to a stanchion 49 adjacent the tank, and this elevation is marked on the stanchion.

Thereafter, the telescope is further swung around to the second position illustrated in broken lines in FIG. 2, And a sighting is taken along the line 50 on the graduated member 39. With the telescope in this position a reading is taken on the scale. The known precise distance between the tip 29 and the mark 30 on the probe 28 is subtracted from this reading, and the level head 33 is lowered by means of the wheel 37 until the telescope is aligned with this lower reading on the scale. The elevation of the instrument 19 or, in other words, the line of sight of the telescope 38, is then the same as the surface 15 of the molten metal. By means of the telescope, this elevation is then also marked on the stanchion 49 to serve as a reference point for closure when the survey is completed.

In order to simplify calculations, once the level is set at the metal surface elevation, the graduated member or scale 39 may be moved up or down to indicate a convenient figure, such as zero, at this elevation. Since all roll and exit lip measurements are referred back to the scale, the elevations may then be quickly and easily determined from the subsequent scale reading. As illustrated in FIG. 4, in order to determine roll elevations the measuring jig 21 is held by the handle 42 with its recessed end portion 43 resting on the trunnion 41 and the bubble tube 46 indicating that the handle, and thus the arm 44, are properly oriented. The wheel 37 of the level is then manipulated until the telescope 38 is aligned along the line of sight 51 with the target 45. A reading is then taken upon the graduated member 39, and this reading is recorded since it indicates the elevation of the roll surface relative to the molten metal surface 15. The procedure is repeated for each roll whose elevation is to be determined.

As illustrated in FIG. 3, the gauge device 18 may also conveniently be employed in measuring the elevation of the exit lip 16. Thus, the device is set up with the horizontal beam 22 extending over the exit lip, and the beam is lowered by means of the screw jack 26 until the tip 29 of the probe 28 just touches the top of the exit lip. This can be observed visually, and use of the volt-ohmmeter 32 is not required. The level is aligned with the mark 30 along the line of sight 52, and a reading is taken on the graduated member 39 along the line of sight 53. The known distance between the tip 29 and the mark 30 is subtracted from this scale reading to give the relative elevation of the exit lip.

In order to insure the accuracy of the entire procedure, a final observation may be taken of the mark on the stanchion 49 representing the elevation of the metal surface 15. The telescope is aligned with this mark, and a reading is then taken on the graduated member 39. By thus closing the survey, any difference between this final reading on the graduated member and the original setting of the surface elevation 15 thereon will indicate the likelihood and degree of error in previous readings.

The entire procedure is then repeated on the other side of the float glass facility. Since the metal surface 15 represents a near perfect reference plane, the elevations observed at opposite ends of the rolls 14 and 17 and the exit lip 16 are completely correlated.

The invention may also be employed for other determinations in the float glass facility. Thus, it has been found particularly beneficial in determining the depth of the molten metal bath 11 at various locations within the tank 12. For this purpose a device (not shown), similar to the gauging device 18 but having a horizontal beam through which liquid is circulated for cooling purposes, may be employed. A probe with known dimensions somewhat longer than the probe 28 and made of a material not affected by the molten metal 11, such as tungsten, is employed. The probe is lowered into the molten metal until it touches the floor of the tank, and the level 19 and graduated member 39 are employed to determine the depth of the metal at this particular point in the previously outlined manner.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A method of redetermining the relative elevations of structural components of an operating float glass facility, wherein a glass ribbon is formed on a bath of molten metal, independently of the elevation of the original construction reference point by which they were installed, including the steps of determining the vertical position of the surface of said bath of molten metal to establish said surface as a new reference plane, observing the vertical position of one of said structural components, and measuring the difference between the vertical position of said structural component and said surface to thereby determine the elevation of said structural component relative to said surface.

2. A method of determining relative elevations of structural components of a float glass facility as claimed in claim 1, including setting a reference mark with a known elevation relative to said vertical position of said surface, and measuring the difference between the vertical position of said last named component and said reference mark for determining the elevation of said last named component relative to said surface.

3. A method of determining the relative elevations of structural components of a float glass facility as claimed in claim 1, wherein said glass ribbon is removed from said molten metal over a series of lift out rolls and lehr rolls, and said component whose elevation is determined is one of said lift out rolls or lehr rolls.

4. A method of determining the relative elevations of structural components of a float glass facility as claimed in claim 3, wherein the ribbon supporting portion of said lift out and lehr rolls is within an enclosure, including the step of observing the vertical position of a portion of one of the journals of said lift out or lehr roll outside said enclosure to thereby indicate the relative elevation of said ribbon supporting portion from known dimensions of said roll.

5. A method of determining the relative elevations of structural components of a float glass facility as claimed in claim 1, wherein said component whose elevation is determined is an exit lip over which said glass ribbon is removed from said molten metal bath at the end of the tank containing the metal bath.

6. A method of determining the relative elevations of structural components of a float glass facility as claimed in claim 5, wherein the vertical position of said exit lip is determined by lowering a probe into contact with the upper surface of said lip and observing the vertical position of a reference mark on said probe located a known vertical distance from the contact point of said probe.

7. A method of determining the relative elevations of structural components of a float glass facility as claimed in claim 1, wherein said last named component extends transversely across the longitudinally extending float glasss facility, and its elevation relative to said surface is determined first for the end at one side of said facility and then for the end at the other side of said facility.

8. A method of redetermining the relative elevations of structural components of an operating float glass facility independently of the elevation of the original construction reference point by which they were installed, and wherein a glass ribbon is formed on a bath of molten metal and removed therefrom over an exit lip at the end of the tank containing said molten metal bath upon a series of lift out and lehr rolls, including the steps of lowering a probe until its tip makes contact with the surface of the bath of molten metal, aligning the line of sight of the telescope of a vertically adjustable level with a mark located a known distance above the contacting tip of said probe, taking a first reading on a graduated reference scale located alongside said float glass facility, observing with said telescope one of said structural components whose elevation is to be redetermined, and vertically adjusting said telescope to bring its line of sight into alignment with the structural component whose elevation is to be redetermined, taking a second reading upon said graduated scale with said telescope at the latter elevation, and utilizing said known distance on said probe and said first and second readings on said graduated scale to redetermine the elevation of said structural component relative to the surface of the bath of molten metal.

9. A method of determining the relative elevations of structural components of a float glass facility as claimed in claim 8, wherein said telescope is lowered while sighting upon said graduated scale by an amount equal to the distance between said mark on said probe and the tip of said probe so that the line of sight of said telescope is at the same elevation as said surface before taking additional readings upon other of said components.

10. A method of determining the relative elevations of structural components of a float glass facility as claimed in claim 8, wherein the vertical position of said other component is determined by positioning a locating means in contact with said other component and vertically aligning the line of sight of said telescope with a target on said locating means a known distance from the contacting end of said locating means.

11. A method of determining the relative elevations of structural components of a float glass facility as claimed in claim 9, including the steps of establishing a mark on a stanchion of said float glass facility at the elevation of said surface after said telescope has been lowered to the elevation of said surface, and taking a reading upon said mark and said scale after the readings upon the other components have been completed for closing the survey of the elevations and determining the possibility of error therein.

12. Apparatus for redetermining relative elevations of structural components of an operating float glass facility whose elevations were originally established during construction upon the basis of a first reference elevation, including a tank containing a bath of molten metal upon which a glass ribbon is continuously formed and whose surface is utilized as a second independent reference elevation, vertically movable probe means positionable over said surface having a visible mark thereon for precisely indicating the vertical position of said surface, locating means including a visible target thereon for engaging and indicating the vertical position of said structural components, a graduated scale positioned adjacent said tank, and vertically adjustable level means positioned to permit observation of said probe means, locating means and graduated scale for relating the elevations of said structural components to said second reference elevation.

13. Apparatus for determining relative elevations of structural components of a float glass facility as claimed in claim 12, wherein said probe means comprises an elongated member having a tip for contacting the surface of the molten bath and a visible mark located a known distance from said tip.

14. Apparatus for determining relative elevations of structural components of a float glass facility as claimed in claim 13, including a volt ohmmeter electrically connected to said probe so as to indicate when said tip is in contact with said molten metal.

15. Apparatus for determining relative elevations of structural components of a float glass facility as claimed in claim 12, wherein said locating means comprises a measuring jig including a handle with a portion adapted to rest upon the surface whose elevation is to be determined, an arm extending perpendicular to said handle, a visible target on said arm a predetermined distance from said portion contacting the component whose elevation is to be determined, and a bubble tube upon said handle for indicating when said handle is horizontally oriented.

* * * * *